(No Model.)
A. B. HENDRYX.
DUPLEX BIRD CAGE SPRING.
No. 528,721. Patented Nov. 6, 1894.
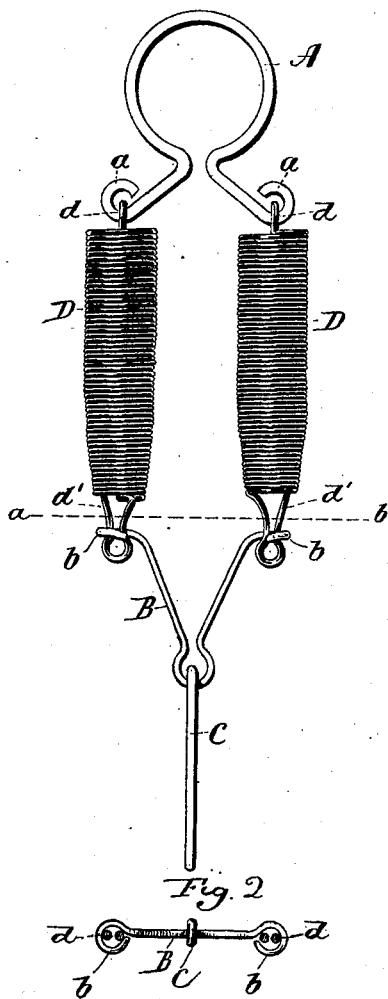

United States Patent Office.

ANDREW B. HENDRYX, OF NEW HAVEN, CONNECTICUT.

DUPLEX BIRD-CAGE SPRING.

SPECIFICATION forming part of Letters Patent No. 528,721, dated November 6, 1894.

Application filed February 17, 1894. Serial No. 500,524. (No model.)

*To all whom it may concern:*

Be it known that I, ANDREW B. HENDRYX, of New Haven, in the county of New Haven and State of Connecticut, have invented a new Improvement in Duplex Bird-Cage Springs; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a duplex bird-cage spring constructed in accordance with my invention; Fig. 2, a view of the device in horizontal section on the line $a$—$b$ of Fig. 1.

Heretofore duplex bird-cage springs have been objectionable because the permanent extension and consequent axial rotation of the springs, in use, has caused them to stand awry when relieved of tension, and present a very unsightly appearance.

The object of my invention is to avoid the objection above mentioned, and produce a simple, effective and attractive device, in which the axial rotation of the springs is provided for.

With these ends in view, my invention consists in a duplex bird-cage spring having certain details of construction as will be hereinafter described and pointed out in the claim.

As herein shown, my improved device comprises a wire suspension ring A, a wire suspension bar B, a suspension hook C depending from the said bar, and two tapering spiral springs D D, each connected at one end with the ring A, and at the opposite end with the bar B. For the purpose of connecting the springs with the ring A, the same is formed with two vertically arranged eyes $a\,a$, receiving vertically arranged loops $d\,d$, formed at the upper ends of the springs, while for connecting the lower ends of the springs with the suspension bar B, the lower ends of the wires of which they are formed, are longitudinally extended to form loop-like fingers $d'\,d'$, contracted toward their lower ends to form necks which are embraced by horizontally arranged eyes $b\,b$, formed at the upper ends of the suspension bar B, the necked portions of the fingers $d'\,d'$ being enough smaller than the eyes $b\,b$ to rotate freely therein. It will thus be seen that each spring has a swiveled connection at one end, and that it may rotate on its axis without pulling other parts of the device around with it, as in duplex bird-cage springs as heretofore constructed, so that when the bird-cage suspended from the device is removed, and the springs are allowed to recover, they will hang side by side, and truly, notwithstanding the fact that either or both of them have been extended and set in new positions since they were first assembled. I have spoken of the axial rotation of the springs in their permanent extension and in explanation of that I may say that when a coiled spring is extended beyond its point of recovery, it takes a new axial position when it recovers.

As shown herein, both springs are swiveled at their lower ends to the suspension bar, but if desired both may be swiveled at their upper ends to the suspension ring, or both may be swiveled at both ends, or one may be swiveled at one end to the suspension ring and the other to the suspension bar.

The variations above referred to being of a perfectly obvious character, it is not thought that they need illustration or special description. I would therefore have it understood that I do not limit myself to the exact construction herein shown and described, but hold myself at liberty to make such changes and alterations as fairly fall within the spirit and scope of my invention.

I do not broadly claim duplex bird-cage springs, that is to say, bird-cage springs having two corresponding springs arranged parallel with each other, nor do I broadly claim a suspension device having a swivel spring.

Having fully described my invention, what I claim as new, and desire to secure by Letters Patent, is—

In a duplex bird-cage spring, the combination with a suspension-ring, of a suspension bar, and two spiral springs connected at each end to the said ring and bar, each spring being constructed at one end with an integral longitudinal finger, contracted between its ends to form a neck, and one of the other members of the said device being constructed with horizontally arranged eyes to loosely embrace the necked portions of the said fingers, substantially as set forth, and whereby the said springs are free to rotate independently of each other, and thus compensate for their unequal extension.

In testimony whereof I have signed this specification in the presence of two subscribing witnesses.

ANDREW B. HENDRYX.

Witnesses:
EDWARD N. PECK,
FERDINAND A. WAGNER.